(12) United States Patent
Ho

(10) Patent No.: US 9,213,383 B2
(45) Date of Patent: Dec. 15, 2015

(54) SWITCHING CIRCUIT MODULE, COMPUTER SYSTEM, AND METHOD FOR CONTROLLING COMPUTER SYSTEM RESET THEREOF

(71) Applicant: PEGATRON CORPORATION, Taipei (TW)

(72) Inventor: Ching-Lung Ho, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 424 days.

(21) Appl. No.: 13/783,790

(22) Filed: Mar. 4, 2013

(65) Prior Publication Data

US 2013/0254518 A1 Sep. 26, 2013

(30) Foreign Application Priority Data

Mar. 22, 2012 (TW) .............................. 101109909 A

(51) Int. Cl.
*G06F 1/00* (2006.01)
*G06F 1/26* (2006.01)
*G06F 1/24* (2006.01)
*G06F 1/32* (2006.01)

(52) U.S. Cl.
CPC .. *G06F 1/26* (2013.01); *G06F 1/24* (2013.01); *G06F 1/32* (2013.01)

(58) Field of Classification Search
CPC ............... G06F 1/32; G06F 1/26; G06F 1/28; G06F 1/24
USPC ......... 713/300, 310, 320, 321, 322, 323, 324, 713/330, 340, 375
See application file for complete search history.

(56) References Cited

U.S. PATENT DOCUMENTS

| 6,253,319 | B1* | 6/2001 | Tran et al. ........................ 713/1 |
| 7,583,556 | B2* | 9/2009 | Zhu .................................. 365/226 |
| 7,949,886 | B2* | 5/2011 | Zou et al. ........................ 713/300 |
| 2003/0229431 | A1* | 12/2003 | Koors ............................. 701/45 |
| 2007/0290701 | A1 | 12/2007 | Nguyen |
| 2007/0293125 | A1* | 12/2007 | Jenkins et al. ................ 446/454 |
| 2010/0090729 | A1* | 4/2010 | Shi .................................. 327/143 |
| 2012/0173891 | A1* | 7/2012 | Mo et al. ........................ 713/300 |
| 2013/0097452 | A1* | 4/2013 | Cheng et al. ................... 713/500 |

FOREIGN PATENT DOCUMENTS

| TW | 200825693 A | 6/2008 |
| TW | 201030504 A1 | 8/2010 |

* cited by examiner

*Primary Examiner* — Jaweed A Abbaszadeh
*Assistant Examiner* — Keshab Pandey
(74) *Attorney, Agent, or Firm* — Muncy, Geissler, Olds & Lowe, P.C.

(57) ABSTRACT

A switching circuit module, a computer system, and a method for controlling computer system reset thereof are disclosed. The switching circuit module is used for allowing a user to cut off a RTC reset high-level signal generated by an internal power supply module at a shutdown state. The switching circuit module includes a processing module, a first control switch, a chipset, and a switch module. The first control switch is used for being operated by the user to generate a first control signal. The chipset is used for receiving a RTC reset signal. When the processing module continuously receives the first control signal to exceed a first setting time, the processing module further determines whether stop receiving the first control signal in a second setting time. If yes, a pulse signal is generated to cut off the RTC reset high-level signal transmitted to the chipset.

15 Claims, 5 Drawing Sheets

SWITCHING CIRCUIT MODULE, COMPUTER SYSTEM, AND METHOD FOR CONTROLLING COMPUTER SYSTEM RESET THEREOF

FIELD

The preferred embodiment of the present invention relates to a switching circuit module, a computer system and a method for controlling computer system reset thereof; more particularly, the preferred embodiment of the present invention relates to a switching circuit module, a computer system and a method for controlling computer system reset thereof which allow a user to reset by using a switch.

BACKGROUND

With the development of the technology, the computer system has become an indispensable apparatus in the daily life. Sometimes, when the user operates some special functions on the computer system, the input of the power signal must be removed so as to clean the state of the chipset of the computer system kept by the power of the Real Time Clock (RTC), or ground the RTC reset signal of the chipset through a jumper. Thus, the user could make some special operations to the chipset or reset the chipset in the computer system. The afore-described procedure is the RTC reset procedure.

In the prior arts, when we need to execute the RTC reset procedure to the computer system, it has to remove the RTC power supply module manually, for example, remove the battery disposed on the main board of the computer system, or ground the pin of the RTC reset signal of the chipset in the computer system through a jumper and thereby resetting the RTC. However, in the computer system of the prior arts, the user is first requested to detach the casing from the computer system, and then find the correct battery or the location of the pin of the RTC reset signal within the complicated circuit layout so as to reset the RTC. Therefore, it is inconvenience to the user, and the computer system may be damaged when detaching the casing from the computer system.

In summary, to solve the problems of the prior arts, inventions such as a switching circuit module, a computer system, and a method for controlling computer system reset thereof are needed.

SUMMARY

The main object of the present invention is to provide a switching circuit module allowing the user to reset the computer by using the switch.

Another main object of the present invention is to provide a computer system having the switching circuit module.

Still another main object of the present invention is to provide a method of controlling computer system reset.

In order to achieve the above objects, the preferred embodiment of the present invention discloses a switching circuit module, which is applicable to a computer system for allowing a user to optionally cut off a RTC reset high-level signal generated by an internal power supply module at a shutdown state of the computer system. The switching circuit module comprising a processing module, a first control switch, a chipset, and a switch module. The first control switch is electrically connected to the processing module for being operated by the user to generate a first control signal. The chipset is electrically connected to the internal power supply module for receiving the RTC reset high-level signal. The switch module is electrically connected to the processing module and the chipset. When the processing module continuously receives the first control signal to exceed a first setting time, the processing module would further determine whether stop receiving the first control in a second setting time. If yes, a pulse signal would be generated for controlling the switch module to cut off the RTC reset high-level signal transferred to the chipset.

The computer system of the preferred embodiment of the present invention comprises an internal power supply module and a switching circuit module. The internal power supply module provides a RTC reset high-level signal. The switching circuit module is electrically connected to the internal power supply module for being operated by a user to optionally cut off the RTC reset high-level signal generated by the internal power supply module at a shutdown state of the computer system. The switching circuit module comprises a processing module, a first control switch, a chipset, and a switch module. The first control switch is a Hall Effect switch and electrically connected to the processing module for being operated by the user to generate a first control signal by using a magnet. The chipset is electrically connected to the internal power supply module for receiving the RTC reset high-level signal. The switch module is electrically connected to the processing module and the chipset. When the processing module continuously receives the first control signal to exceed a first setting time, the processing module would further determine whether stop receiving the first control signal in a second setting time. If yes, a pulse signal would be generated for controlling the switch module to cut off the RTC reset high-level signal transferred to the chipset.

A method for controlling computer system reset in accordance with the preferred embodiment of the present invention comprises the following steps: providing a first control switch for being operated by a user to generate a first control signal; determining whether the first control signal is continuously received to exceed a first setting time; if yes, further determining whether stop receiving the first control in a second setting time; and if yes, generating a pulse signal to cut off the RTC reset high-level signal.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

The advantages and innovative features of the invention will become more apparent from the following detailed description when taken in conjunction with the accompanying drawings.

Figure 1:
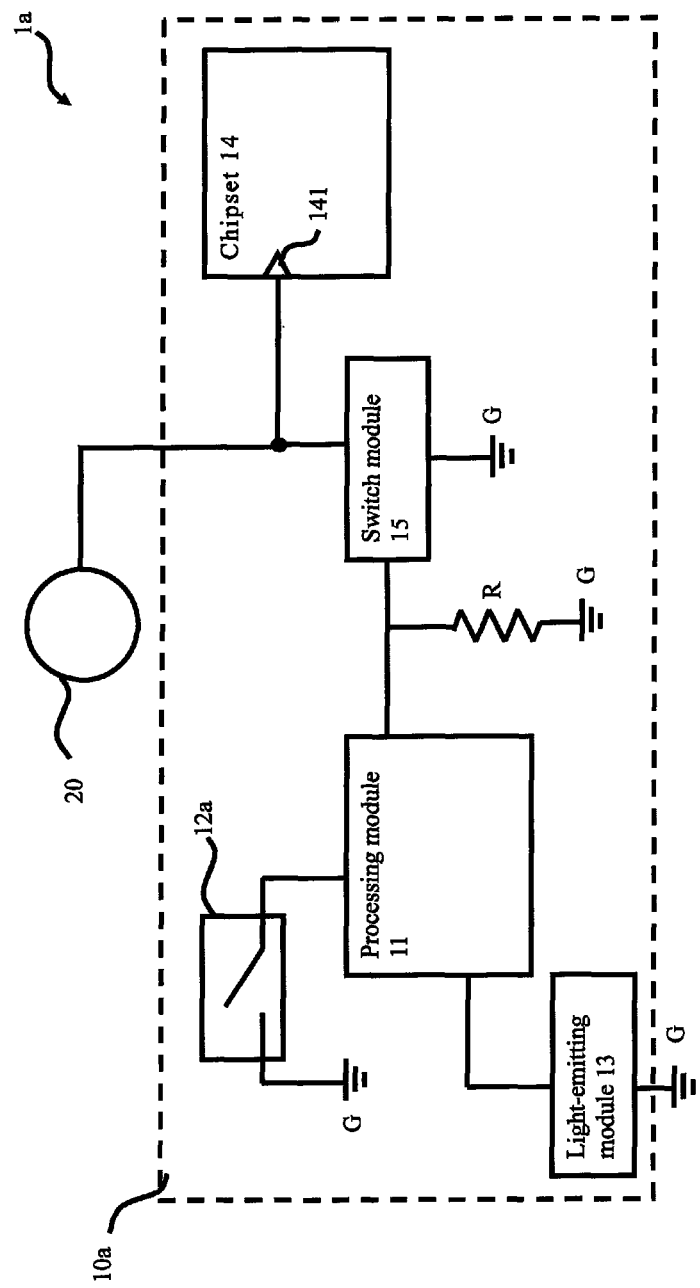
FIG. 1 is a structure schematic diagram of the first embodiment of the computer system of the present invention.

Please first refer to FIG. 1, which is a structure schematic diagram of the first embodiment of the computer system of the present invention.

The computer system 1a of the preferred embodiment of the present invention could be apparatuses such as a desktop computer, a laptop or a tablet, but the aforementioned examples do not limit the preferred embodiment of the present invention. The computer system 1a comprises a switching circuit module 10a and an internal power supply module 20. The internal power supply module 20 could be a battery for providing power to the Real Time Clock (RTC) inside the computer system 1a and providing a RTC reset high-level signal to the RTC. The computer system 1a uses the RTC power to execute the operation procedures. The working mechanism of the RTC power is widely used by those skilled in the art of the preferred embodiment of the present invention, thus it would not be described here. Besides, the RTC reset high-level signal is transmitted to a reset pin 141 of the chipset 14 in the switching circuit module 10a. The switching circuit module 10a is electrically connected to the internal power supply module 20, and when the RTC reset high-level signal is continually transmitted to the chipset 14, it means that the computer system 1a is working normally. However, when the reset pin 141 of the chipset 14 stop receiving the RTC reset high-level signal, the chipset 14 would execute the RTC reset procedure. Thus, the user could use the switching circuit module 10a to optionally cut off the transition of the RTC reset high-level signal so as to achieve the object of the RTC resetting. In the first embodiment of the present invention, the RTC resetting is executed under the shutdown state of the computer system 1a, but it would not limit the preferred embodiment of the present invention.

The switching circuit module 10a includes a processing module 11, a first control switch 12a, a light-emitting module 13, a chipset 14, and a switch module 15. The processing module 11 is formed by the hardware, the software combined with the hardware or the firmware combined with the hardware, for example, an embedded controller, but the aforementioned examples do not limit the preferred embodiment of the present invention.

The first control switch 12a is electrically connected to the processing module 11, and another side of the first control switch 12a is electrically connected to the ground end G. The first control switch 12a is a Hall Effect switch, which could sense an external magnetic force and then act, but the example does not limit the preferred embodiment of the present invention, and the first control switch 12a could also be another physical button. Therefore, when a user uses a magnet to approach the first control switch 12a, the first control switch 12a could sense that and generate a first control signal, and the first control signal would be transmitted to the processing module 11. The working mechanism of Hall Effect switch is widely used by those skilled in the art of the preferred embodiment of the present invention, thus it would not be described here. The processing module 11 would determine whether the first control signal is continuously received to exceed a first setting time, for example four seconds, and when the time is over the first setting time, the processing module 11 would think that the user wants to reset the RTC.

The light-emitting module 13 could be a light emitting diode and electrically connected to the processing module 11, such that the processing module 11 could control the light-emitting module 13 to emit light or turn off it. When the first control signal is continuously received to exceed the first setting time, the processing module 11 would control the light-emitting module 13 to emit light. In the first embodiment of the present invention, the processing module 11 could output a Pulse Width Modulation (PWM) signal to the light-emitting module 13, such that the light-emitting module 13 could start to glitter thereby notifying the user to reset the RTC. After a confirming time elapses, the processing module 11 would control the light-emitting module 13 to be turned off so as to inform the user, wherein the confirming time could be eight seconds, but the preferred embodiment of the present invention is not limited within it.

The chipset 14 is electrically connected to the internal power supply module 20, and thus the RTC reset high-level signal could be received by a reset pin 141. In the common state, the reset pin 141 of the chipset 14 receives the RTC reset high-level signal, and thus the computer system 1a is able to execute the operation procedures using the RTC power. The switch module 15 could be an electric circuit device having a switching function, such as a metal-oxide semiconductor transistor, but the preferred embodiment of the present invention is not limited within the aforementioned example. The switch module 15 is electrically connected to the processing module 11 and the chipset 14, and disposed on the circuit of the chipset 14 connecting to the internal power supply module 20, so as to determine whether cut of the RTC reset high-level signal received by the reset pin 141 of the chipset 14. Thus, in the first embodiment of the present invention, when the user again operates the first control switch 12a in a second setting time, such as removing the magnet, the processing module 11 would not receive the first control signal, and thereby knowing the user does want to execute the RTC resetting to computer system 1a, wherein the second setting time could be three seconds, but the preferred embodiment of the present invention does not limit it. When the computer system 1a executes the RTC resetting, the processing module 11 would generate a pulse signal to control the switch module 15 to be temporarily turned on, and let the RTC reset signal to be transmitted to the ground end G. Thus, the chipset 14 has to execute the RTC resetting due to the reset pin 141 continuously receives no RTC reset high-level signal.

Except the aforementioned components, the switching circuit module 10a could further comprise other circuit components. For example, if the switch module 15 has to be turned on by a high voltage pulse signal, then the connecting circuit between the processing module 11 and the switch module 15 could have a resistor R connected to the ground end G, thus the processing module 11 could keep output low voltage signal in the common state and avoid the false action made by the switch module 15.

Figure 2:
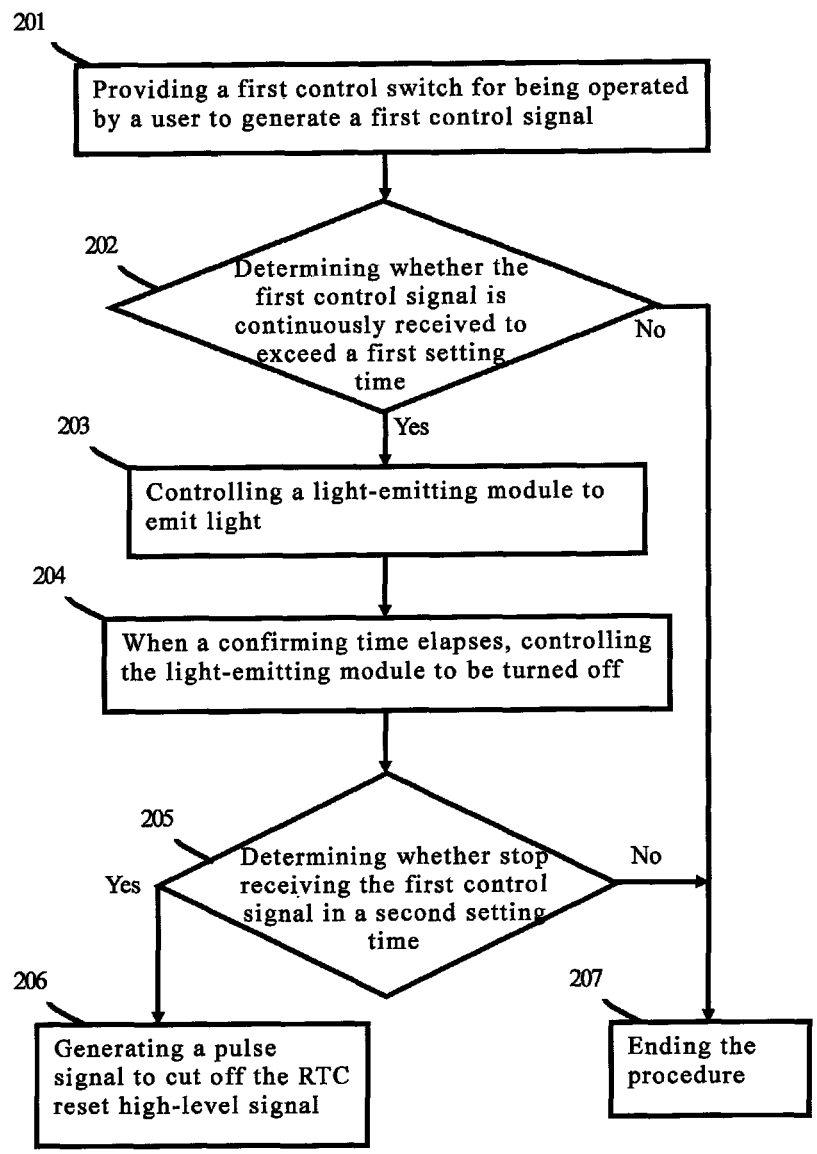
FIG. 2 is a flow chart of the first embodiment of the method for controlling computer system reset of the present invention.

Next, please refer to FIG. 2, which is a flow chart of the first embodiment of the method for controlling computer system reset of the present invention. It has to be noted that though the following takes the computer system 1a having the switching circuit module 10a as an example to interpret the method of controlling computer system reset, the method of controlling computer system reset in accordance with the present is not limited to be used in the aforementioned switching circuit module 10a or the computer system 1a.

When in the shutdown state of the computer system 1a, first executing the step 201: providing a first control switch for being operated by a user to generate a first control signal.

When the computer system 1a is in the shutdown state and it has to execute the RTC resetting, first provide a first control switch 12a to a user for operation, for example using a magnet so as to let the first control switch 12a sense the magnet and thereby generating a first control signal, and then transfer the first control signal to the processing module 11.

Next, executing the step 202: determining whether the first control signal is continuously received to exceed a first setting time.

Next, the processing module 11 determines whether the first control signal is continuously received to exceed the first setting time, so as to determine whether the user really wants to execute the RTC resetting procedure.

If the processing module 11 confirms that the first control signal is continuously received to exceed the first setting time, then executing the step 203: controlling a light-emitting module to emit light.

At this time, the processing module 11 controls the light-emitting module 13 to emit light, for example, flickering or keep emitting, so as to tell the user that the computer system 1a is going to execute the RTC resetting procedure.

Following executing the step 204: when a confirming time elapses, controlling the light-emitting module to be turned off.

After the light-emitting module 13 continually emitting light during the confirming time, the processing module 11 controls the light-emitting module 13 to be turned off, so as to tell the user the next step is going to be executed.

Next further executing the step 205: determining whether stop receiving the first control signal in a second setting time.

Following the processing module 11 would determine whether the user stop operating the first control switch 12a during the second setting time, i.e. the processing module 11 could not receive the first control signal. Therefore the processing module 11 could make the final check in this step.

After the aforementioned judging steps, it is confirm that the user does want to execute the RTC resetting procedure. Then executing the step 206: generating a pulse signal to cut off the RTC reset high-level signal.

The processing module 11 generates the pulse signal thereby making the switch module temporarily be turned on to ground the RTC reset signal. Thus, the RTC reset high-level signal transmitted to the reset pin 141 of the chipset 14 could be cut off, and the RTC resetting is achieved.

If anyone of the aforementioned steps (step 202 or step 205) is not finished, it may means that the user does not want to execute the RTC resetting. Thus, executing the step 207: ending the procedure.

Now the processing module 11 would end the procedure and back to the stand-by state.

Figure 3:
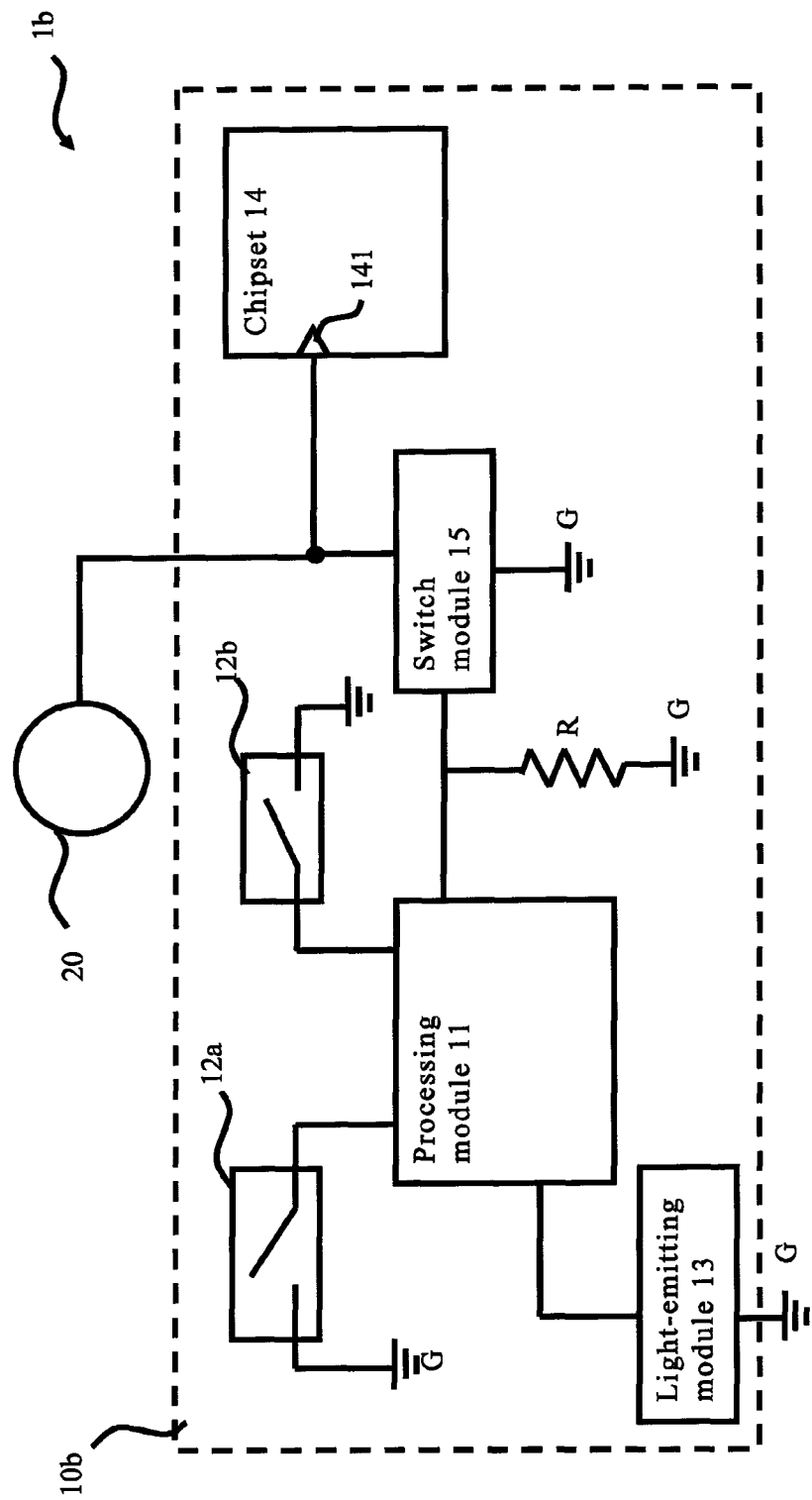
FIG. 3 is a structure schematic diagram of the second embodiment of the computer system of the present invention.

The present invention has another embodiment. Please refer to FIG. 3, which is a structure schematic diagram of the second embodiment of the computer system of the present invention.

In the second embodiment of the present invention, the switching circuit module 10b of the computer system 1b further comprises a second control switch 12b. The second control switch 12b could be the main power switch of the computer system 1b, but the preferred embodiment of the present invention does not limit it, the second control switch 12b could also be other physical button. The second control switch 12b is electrically connected to the processing module 11 and provided for being operated by the user to generate a second control signal. Therefore, the processing module 11 could confirm whether execute the RTC resetting according to the extra second control signal.

Figure 4A:
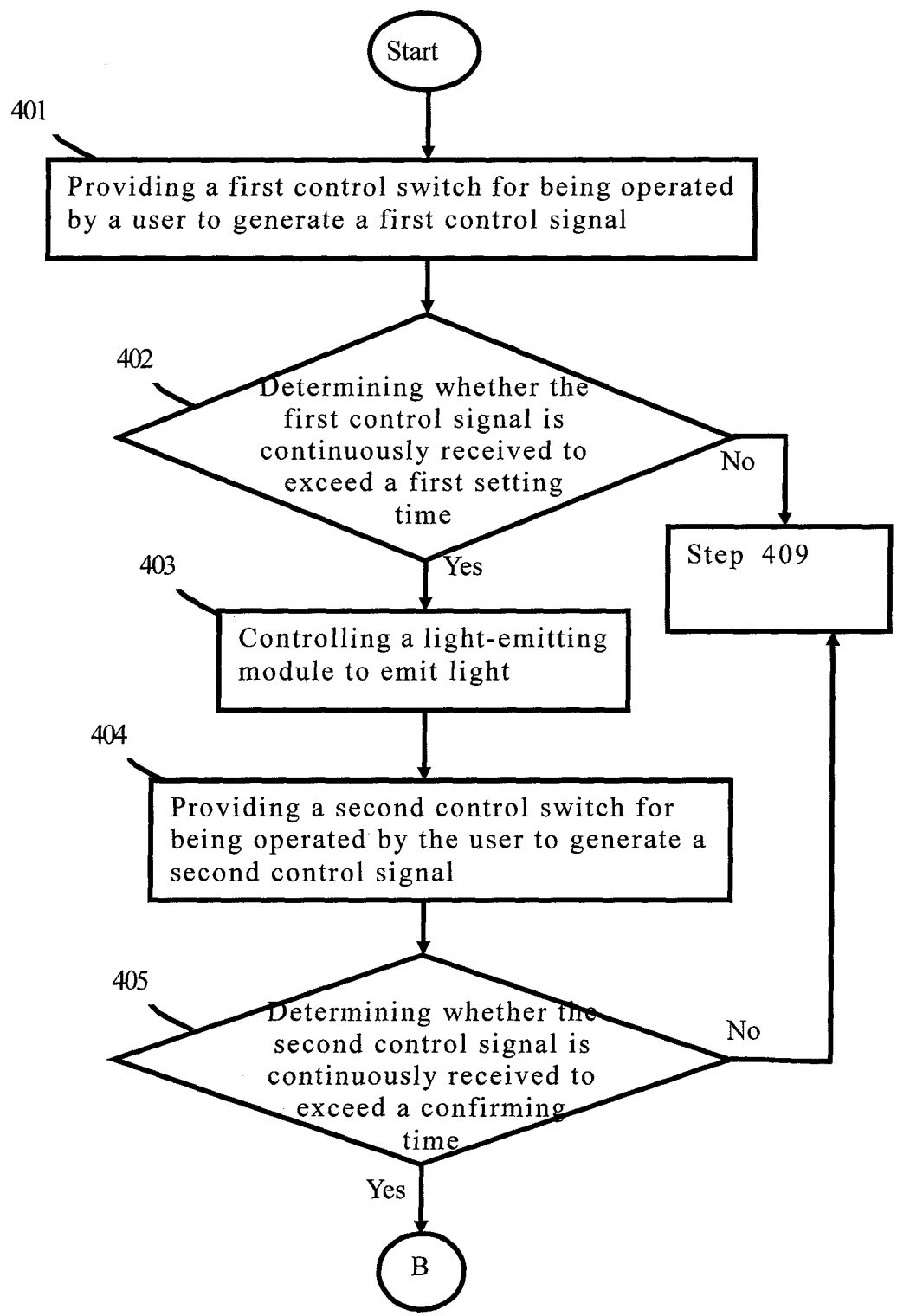
FIG. 4A-4B is a flow chart of the second embodiment of the method for controlling computer system reset of the present invention.
Figure 4B:
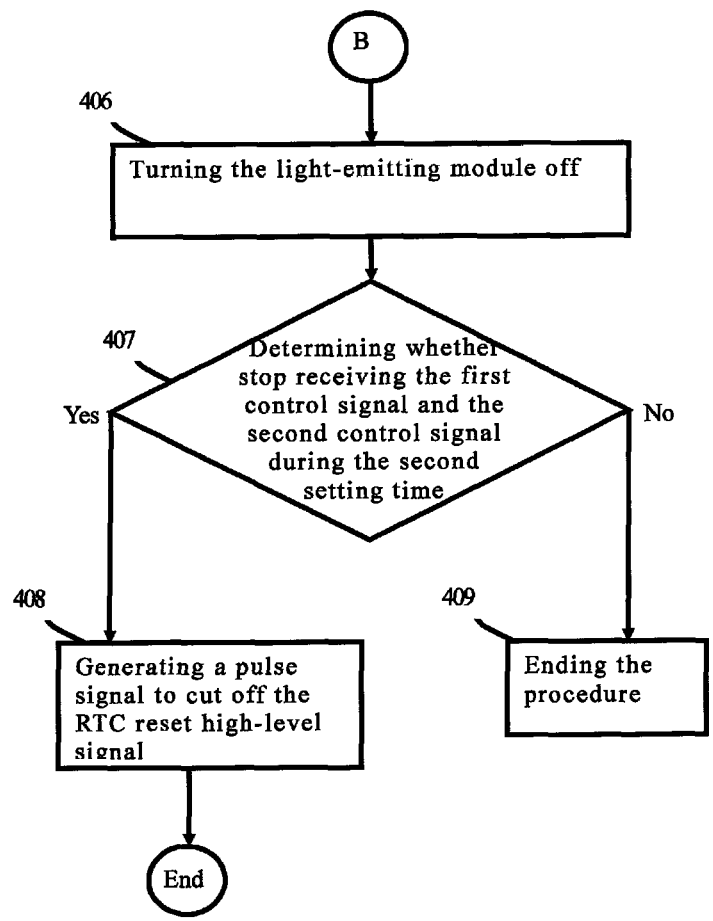

Here please refer to FIG. 4A-4B, which is a flow chart of the second embodiment of the method for controlling computer system reset of the present invention.

First executing the step 401: providing a first control switch for being operated by a user to generate a first control signal.

When the computer system 1b is in the shutdown state and must execute the RTC resetting, the first control switch 12a is firstly provided for the user to operate to generate the first control signal, and transmit the first control signal to the processing module 11.

Next executing the step 402: determining whether the first control signal is continuously received to exceed a first setting time.

Next, the processing module 11 determines whether the first control signal is continuously received to exceed the first setting time. If the processing module 11 confirms that the first control signal is continuously received to exceed the first setting time, then executing the step 403: controlling a light-emitting module to emit light.

At this time, the processing module 11 controls the light-emitting module 13 to emit light so as to tell the user that the computer system 1a is going to execute the RTC resetting procedure. Because the aforementioned steps 401-403 are similar to the steps 201-203, they would not be described here again.

Following executing the step 404: providing a second control switch for being operated by the user to generate a second control signal.

After the light-emitting module 13 emits lights, the second control switch 12b is provided to the user to operate the second control switch and thereby generating the second control signal and the second control signal is transmitted to the processing module 11.

Further executing the step 405: determining whether the second control signal is continuously received to exceed a confirming time.

Similarly to the step 402, the processing module 11 would determines whether the second control signal is continuously received from the second control switch 12b to exceed the confirming time, so as to determine if the user really wants to execute the RTC resetting procedure.

After the confirming time elapses, if the processing module 11 still receives the second control signal, then the processing module 11 would confirm that the user really wants to execute the RTC resetting procedure. Thus, executing the step 406: turning the light-emitting module off.

At this time the processing module 11 turns the light-emitting module off so as to tell the user to execute the next step.

Following executing the step 407: determining whether stop receiving the first control signal and the second control signal during the second setting time.

Following the processing module 11 would confirm that whether the user stop operating the first control switch 12a and the second control switch 12b. That means, the processing module 11 could not be received the first control signal and the second control signal during the second setting time, and the processing module 11 could make the final check here.

After finishing the aforementioned determining procedures, it could confirm that the user really wants to execute the RTC resetting procedure, thus executing the step 408: generating a pulse signal to cut off the RTC reset high-level signal.

The processing module 11 generates the pulse signal thereby making the switch module 15 to be turned on to ground the RTC reset signal. Therefore, the RTC reset high-level signal transmitted to the reset pin 141 of the chipset 14 could be cut off and achieves the RTC resetting.

If anyone of the aforementioned steps 402, 405 or 407 is not finished, it means that the user does not want to execute the RTC resetting. Thus, executing the step 409: ending the procedure.

Now the processing module 11 ends the procedure and back to the stand by state.

It has to be noted here that the sequence of the above steps of the method for controlling computer system reset in accordance with the preferred embodiment of the present invention is not limited within the above examples. In order to achieve the object of the preferred embodiment of the present invention, the sequence of the above steps may also be changed.

The preferred embodiment of the present invention uses the abovementioned switching circuit module 10a or 10b to allow the user to execute the RTC resetting on the computer system 1a or 1b without detaching the casing of the computer system 1a or 1b, and the start of RTC resetting procedure could be prevented when the first control switch 12a or the second control switch 12b is miss-touched.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A switching circuit module applicable to a computer system, for allowing a user to optionally cut off a RTC reset high-level signal generated by an internal power supply module at a shutdown state of the computer system, the switching circuit module comprising:
   a processing module;
   a first control switch, electrically connected to the processing module for being operated by the user to generate a first control signal, wherein the first control switch is a Hall Effect switch provided for being operated by the user to generate the first control signal by using a magnet;
   a chipset, electrically connected to the internal power supply module for receiving the RTC reset high-level signal from a reset pin; and
   a switch module, electrically connected to the processing module and the chipset, and when the processing module continuously receives the first control signal to exceed a first setting time, the processing module would further determine whether stop receiving the first control signal in a second setting time, if yes, a pulse signal being generated for controlling the switch module to cut off the RTC reset high-level signal transferred to the chipset.

2. The switching circuit module as claimed in claim 1, further comprising a light-emitting module electrically connected to the processing module; wherein when the processing module continuously receives the first control signal to exceed the first setting time, the processing module would control the light-emitting module to emit light; then after a confirming time elapses, the processing module would control the light-emitting module to be turned off, and then the processing module further determines whether stop receiving the first control signal.

3. The switching circuit module as claimed in claim 1, further comprising a second control switch electrically connected to the processing module, for being operated by the user to generate a second control signal; wherein when the processing module continuously receives the first control signal to exceed the first setting time, the processing module would further determine whether the processing module continuously receives the second control signal to exceed a confirming time.

4. The switching circuit module as claimed in claim 3, further comprising a light-emitting module electrically connected with the processing module; wherein, when the processing module continuously receives the first control signal to exceed the first setting time, the processing module would control the light-emitting module to emit light; when the processing module continuously receives the second control signal to exceed the confirming time, the processing module would control the light-emitting module to be turned off.

5. The switching circuit module as claimed in claim 4, wherein when the light-emitting module is turned off, the processing module would further confirms the first control signal and the second control signal are stopped receiving during the second setting time firstly, and then controls the switch module to cut off the RTC reset high-level signal.

6. A computer system, comprising:
   an internal power supply module, providing a RTC reset high-level signal;
   a switching circuit module, electrically connected to the internal power supply module for being operated by a user to optionally cut off the RTC reset high-level signal generated by the internal power supply module at a shutdown state of the computer system, the switching circuit module comprising:
   a processing module;
   a first control switch, which is a Hall Effect switch and electrically connected to the processing module for being operated by the user to generate a first control signal by using a magnet;
   a chipset, electrically connected to the internal power supply module for receiving the RTC reset high-level signal from a reset pin; and
   a switch module, electrically connected to the processing module and the chipset, and when the processing module continuously receives the first control signal to exceed a first setting time, the processing module further determines whether stop receiving the first control signal in a second setting time, if yes, a pulse signal would be generated for controlling the switch module to cut off the RTC reset high-level signal transferred to the chipset.

7. The computer system as claimed in claim 6, wherein the switching circuit module further comprises a light-emitting module electrically connected to the processing module; wherein when the processing module continuously receives the first control signal to exceed the first setting time, the processing module would control the light-emitting module to emit light; when a confirming time elapses, the processing module would control the light-emitting module to be turned off, and then further determines whether stop receiving the first control signal.

8. The computer system as claimed in claim 6, wherein the switching circuit module further comprises a second control switch electrically connected to the processing module for being operated by the user to generate a second control signal, wherein when the processing module continuously receives the first control signal to exceed the first setting time, the processing module would further determine whether the second control signal is continuously received to exceed a confirming time.

9. The computer system as claimed in claim 8, wherein the switching circuit module further comprises a light-emitting module electrically connected to the processing module; wherein when the processing module continuously receives the first control signal to exceed the first setting time, the processing module would control the light-emitting module to emit light; when the processing module continuously receives the second control signal to exceed the confirming time, the processing module would control the light-emitting module to be turned off.

10. The computer system as claimed in claim 9, wherein when the light-emitting module is turned off, the processing module would further confirm the first control signal and the second control signal are stopped receiving during the second setting time firstly, and then control the switch module to cut off the RTC reset high-level signal.

11. A method for controlling computer system reset, being applicable to a computer system for allowing a user to optionally cut off a RTC reset high-level signal generated by an internal power supply module at a shutdown state of the computer system, the method comprising the following steps:
provided a first control switch for being operated to generate a first control signal using a magnet, wherein the first control switch is a Hall Effect switch;
determining whether the first control signal is continuously received to exceed a first setting time;
if yes, further determining whether stop receiving the first control in a second setting time; and
if yes, generating a pulse signal to cut off the RTC reset high-level signal.

12. The method as claimed in claim 11, further comprising the following steps: when the first control signal is continuously received to exceed the first setting time, controlling a light-emitting module to emit light; and
when a confirming time is passed, controlling the light-emitting module to be turned off.

13. The method as claimed in claim 11, further comprising the following steps: providing a second control switch for being operated to generate a second control signal; and when the first control signal is continuously received to exceed the first setting time, further determining whether the second control signal is continuously received to exceed a confirming time.

14. The method as claimed in claim 13, further comprising the following steps: when the first control signal is continuously received to exceed the first setting time, controlling the light-emitting module to emit light; and
when the second control signal is continuously received to exceed the confirming time, controlling the light-emitting module to be turned off.

15. The method as claimed in claim 14, further comprising the following steps: when the light-emitting module is turned off, determining whether stop receiving the first control signal and the second control signal during the second setting time; and
if yes, cutting off the RTC reset high-level signal.

* * * * *